(12) United States Patent
Baran

(10) Patent No.: US 9,942,475 B2
(45) Date of Patent: Apr. 10, 2018

(54) REAL CROSS TRAFFIC—QUICK LOOKS

(71) Applicant: Robert Bosch GmbH, Stuttgart (DE)

(72) Inventor: Matthew T. Baran, Northville, MI (US)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 14/808,161

(22) Filed: Jul. 24, 2015

(65) Prior Publication Data

US 2017/0026572 A1    Jan. 26, 2017

(51) Int. Cl.
*H04N 7/00* (2011.01)
*H04N 7/18* (2006.01)
*H04N 5/232* (2006.01)
*G06T 3/40* (2006.01)
*B60R 1/00* (2006.01)
*B60R 11/04* (2006.01)
*G06T 3/00* (2006.01)

(52) U.S. Cl.
CPC ........... *H04N 5/23238* (2013.01); *B60R 1/00* (2013.01); *B60R 11/04* (2013.01); *G06T 3/0018* (2013.01); *G06T 3/4038* (2013.01); *H04N 5/23216* (2013.01); *H04N 7/183* (2013.01); *B60R 2300/605* (2013.01); *B60R 2300/802* (2013.01); *B60R 2300/8046* (2013.01); *G06T 2207/10024* (2013.01); *G06T 2207/20092* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,233,045 | B2 | 7/2012 | Luo et al. |
| 8,254,635 | B2 | 8/2012 | Stein et al. |
| 8,553,069 | B2 | 10/2013 | Kweon |
| 2010/0085170 | A1 | 4/2010 | Oleg |
| 2013/0027558 | A1 | 1/2013 | Ramanath et al. |
| 2014/0055616 | A1 | 2/2014 | Corcoran et al. |

(Continued)

FOREIGN PATENT DOCUMENTS

EP    2180447    4/2010

OTHER PUBLICATIONS

International Search Report and Written Opinion for Application No. PCT/EP2016/062762 dated Sep. 9, 2016 (13 pages).

*Primary Examiner* — Heather Jones
(74) *Attorney, Agent, or Firm* — Michael Best & Friedrich LLP

(57) ABSTRACT

System and method of performing various transformations between an omnidirectional image model and a rectilinear image model for use in vehicle imaging systems. In particular, a panel transform system and method for transforming an omnidirectional image from an omnidirectional camera positioned on a vehicle to a rectilinear image. The rectilinear image is then displayed to the driver for use while performing vehicle maneuvers. The panel transform system and method also provide a rectilinear image model based on the omnidirectional camera for use with existing rectilinear imaging processing systems. The rectilinear image model is determined based on a variable set of input parameters that are defined by both automatic and manual system inputs such as a steering wheel angle sensor and a user interface.

17 Claims, 13 Drawing Sheets

(56) References Cited

U.S. PATENT DOCUMENTS

2014/0114534 A1    4/2014  Zhang et al.
2014/0314336 A1*  10/2014  Yagi .................... G06T 3/0062
                                                        382/282
2015/0062292 A1*   3/2015  Kweon ............. H04N 5/23238
                                                        348/37

* cited by examiner

REAL CROSS TRAFFIC—QUICK LOOKS

BACKGROUND

Embodiments of the invention relate to systems and methods of processing and displaying camera images. In particular, embodiments of the invention relate to converting an omnidirectional camera image to a rectilinear camera image.

SUMMARY

Vehicle imaging systems provide extended fields of view for a driver of a vehicle. A display screen located in the interior of the vehicle displays images from the vehicle's camera to the driver. For example, a rearview camera may be attached to a rear-portion of the vehicle. The rearview camera is configured to point rearward and downward such that objects directly behind the vehicle may be seen via the display. In this way, the driver can see objects behind the vehicle that are not directly visible due to blind spots in the driver's field of view.

One type of rear-view camera is an omnidirectional camera (e.g., a fish-eye lens camera). The omnidirectional camera captures an ultra-wide angle view. When mounted on the rear of a vehicle, some omnidirectional cameras can capture a field of view of 180 degrees behind the vehicle. The ultra-wide view allows the driver to detect vehicles approaching perpendicular to the driver's vehicle. This is particularly beneficial when a driver is backing the vehicle out of a parking space. In this scenario, adjacent, parked vehicles may obstruct the driver's field of view of cross-traffic. Using the rearview camera, the driver may exit the parking space with the aid of the display as the driver attempts to achieve natural visibility.

However, due to the lens of the omnidirectional camera, the image projected to the driver of the vehicle may be distorted. Due to this distortion, it is difficult for the driver to determine a distance between his vehicle and surrounding vehicles. In addition, a speed of surrounding vehicles is also hard to determine based on the omnidirectional image. Therefore, safety benefits are limited with displays that merely project the omnidirectional image to the driver.

Embodiments of the invention provide a system and method that transform regions of interest of the omnidirectional image into one or more rectilinear images. As part of the transformation, distortion that is present in the omnidirectional image is significantly reduced when displayed as the rectilinear image. Using the rectilinear image, the driver can judge the distance and speed of vehicles more accurately. In addition, the rectilinear image allows the driver to better assess the presence of other objects. For example, the driver can see and gauge the distance to pedestrians, poles, shopping carts, etc. through the rectilinear image.

Embodiments of the invention also provide a system and a method that transform between an omnidirectional image model and a rectilinear image model using a panel model defined by a parameter vector. The transformations include mapping between omnidirectional image pixels and rectilinear image pixels and world coordinates and image pixels. An electronic control unit computes the panel model and then performs various image processing functions using the panel model. These functions include providing the panel model to third-party software and hardware models that are configured to operate with rectilinear images. The panel presents a rectilinear image model by mathematically modeling a perspective view from an optical origin of the omnidirectional camera to a region of interest in the omnidirectional image.

In one embodiment, the invention provides a method of converting an omnidirectional image from an omnidirectional camera located on a vehicle to a rectilinear image by a control unit. The control unit accesses an omnidirectional camera model representative of an omnidirectional image on a unit sphere in an optical coordinate system. The omnidirectional camera model has a first plurality of pixels. The control unit receives a set of parameters defining a local plane tangent to the unit sphere. The local plane representative of a rectilinear camera model having a second plurality of pixels. The control unit determines a plane extent of the local plane based on the set of parameters with the plane extent defining a boundary of the local plane. Next, the control unit determines a relationship between the first plurality of pixels and the second plurality of pixels. The omnidirectional image from the omnidirectional camera is received, and the control unit generates a rectilinear image from the omnidirectional image based on the relationship between the first plurality of pixels and the second plurality of pixels.

Another embodiment of the invention provides a method of operating a vehicle imaging system. The method includes receiving, at an electronic control unit, an omnidirectional image from a vehicle-based omnidirectional camera. A first angular perspective vector is determined. A first rectilinear image orthogonal to the first angular perspective vector is then generated, and the first rectilinear image is displayed to a driver of the vehicle. The electronic control unit receives commands from a driver-operated control. The angular perspective vector is adjusted based on the commands. A second rectilinear image orthogonal to the adjusted angular perspective vector is generated, and the second rectilinear image is displayed to the driver.

In yet another embodiment, the invention provides a vehicle imaging system including an omnidirectional camera, a display, a driver-operated control, and an electronic control unit. The electronic control unit is configured to receive an omnidirectional image from the omnidirectional camera and determine a first angular perspective vector. The electronic control unit is further configured to generate a first rectilinear image orthogonal to the first angular perspective vector and send the first rectilinear image to the display. The electronic control unit is also configured to receive commands from the driver-operated control, adjust the angular perspective vector based on the commands, generate a second rectilinear image orthogonal to the adjusted angular perspective vector, and send the second rectilinear image to the display.

Other aspects of the invention will become apparent by consideration of the detailed description and accompanying drawings.

DETAILED DESCRIPTION

Figure 1:
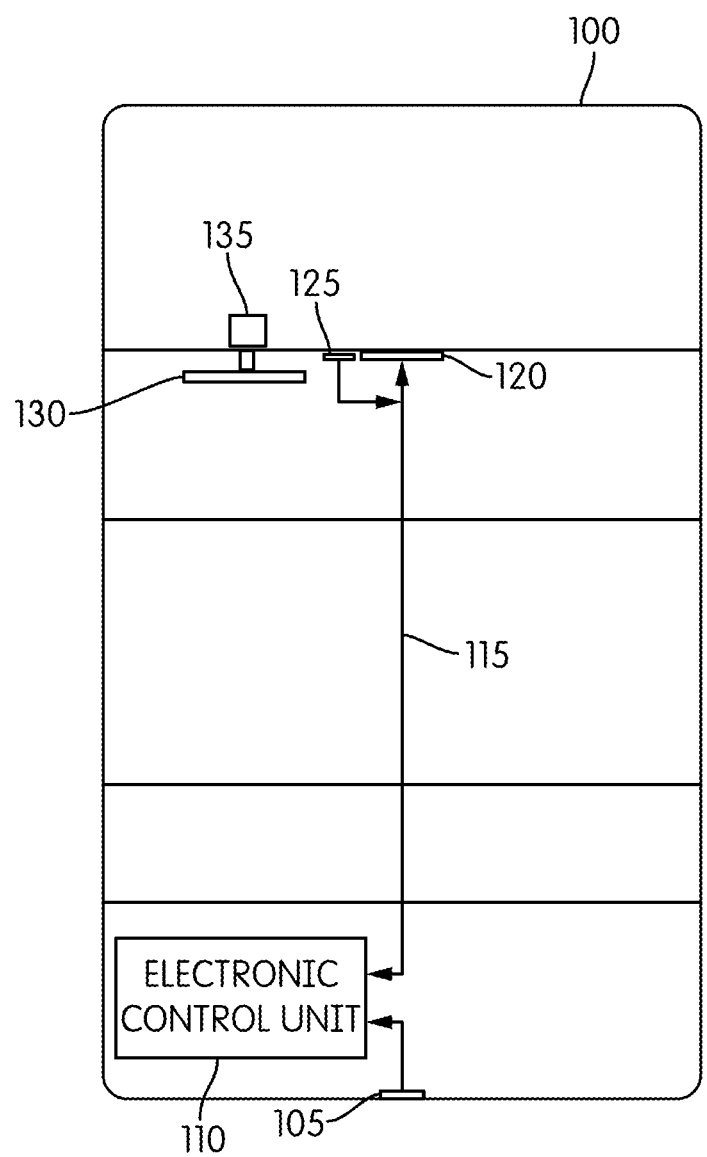
FIG. 1 is an illustration of a vehicle with a panel transform system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

The use of imaging systems is becoming more prolific in modern vehicles. Increasingly, modern vehicles include one or more omnidirectional cameras (e.g., fish-eye lens camera) on the vehicle's exterior to provide wide-angle views around the vehicle. An omnidirectional camera provides a greater field of view than a traditional rectilinear camera. However, the omnidirectional camera captures an image that appears distorted compared to an image captured by a rectilinear camera due to nonlinearities in the image. For example, parallel lines, such as lane markings on a road, appear curved in the image produced by the omnidirectional camera. Often, these camera images are displayed to a driver of the vehicle to increase the driver's awareness of the surroundings. However, when an omnidirectional image is displayed to the driver, the driver may have difficulty gauging distances and speeds of surrounding vehicles based solely on the omnidirectional image.

Some of the systems or methods described herein provide a panel transform that converts an omnidirectional image captured from an omnidirectional camera to a rectilinear image for display to the driver. The rectilinear image contains corrections of the distortion from the omnidirectional image. The corrected image aids the driver in properly gauging distance and speeds of other vehicles. This is particularly useful when the driver is backing out of a parking space. In this situation, the driver's vision may be obscured by vehicles parked adjacent to his vehicle. A vehicle equipped with a rearview, omnidirectional camera may allow the driver to view vehicles obscured by the adjacent vehicles, for example, vehicles approaching perpendicular to the vehicle. So that the driver can properly ascertain the approaching vehicles distance and speed, the omnidirectional image is transformed to a rectilinear image prior to display to the driver.

The panel transform first establishes a region of interest in the omnidirectional image. Once the region of interest is defined, the panel transform converts a portion of the omnidirectional image into the rectilinear image with the methods presented herein. The transformation of the portion of the image is enabled by first mapping a relationship between the region of interest in the omnidirectional image and a perspective view of that region of interest. The mapping provides the panel transform with an ability to perform an array of functions relating to the omnidirectional image.

FIG. 1 illustrates a vehicle 100 equipped with an embodiment of the panel transform. The vehicle 100 includes an omnidirectional camera 105, an electronic control unit (ECU 110), a vehicle communication bus 115 (e.g., a CAN bus), a display 120, and an input interface 125. Some embodiments also include a steering wheel 130 and a steering angle sensor 135 configured to provide an input signal to the ECU 110. The camera 105 is communicatively coupled to the ECU 110, whereby the ECU 110 accesses a plurality of images captured with the camera 105. The plurality of images may be a continuous video stream or a sequence of still images. The ECU 110 processes the plurality of images from the camera 105 and sends processed images to the display 120 for viewing by the driver of the vehicle. The communication bus 115 communicatively couples the ECU 110 with the display 120 along with other vehicle systems. The communication bus 115 thus enables communication between the ECU 110, the display 120, the input interface 125, and other vehicle systems. In some embodiments, the display 120 and the input interface 125 are combined into a single unit. For example, the input interface 125 can receive commands from the driver via a touchscreen on the display 120.

Figure 2:
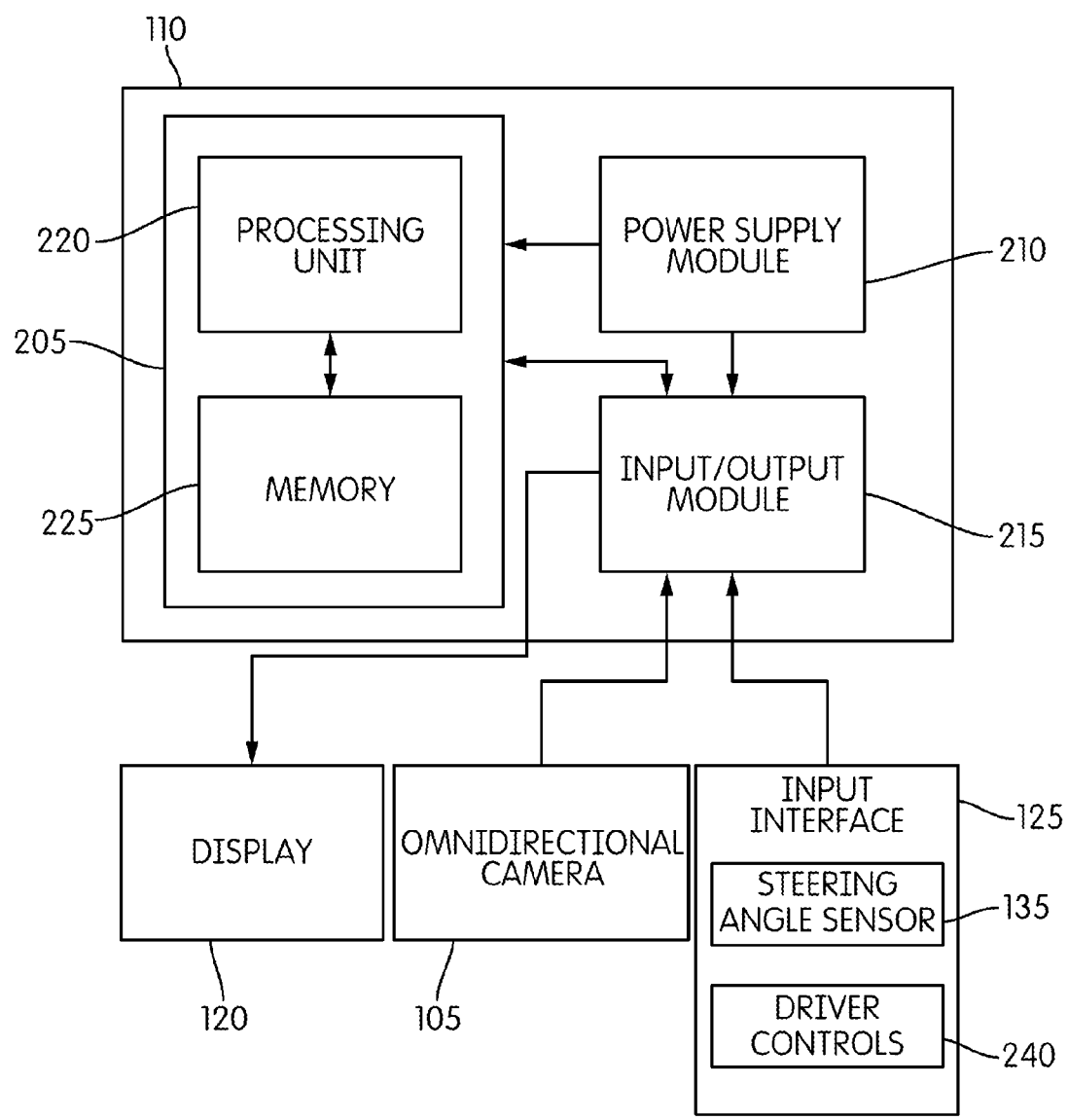
FIG. 2 is a block diagram of an electronic control unit for the panel transform system of FIG. 1.

FIG. 2 is a block diagram of the ECU 110 of the panel transform. The ECU 110, among other things, is configured to transform portions of the omnidirectional images into rectilinear images. The ECU 110 includes a plurality of electrical and electronic components that provide power, operation control, and protection to the components and modules within the ECU 110 and/or the camera 105. For example, the ECU 110 includes, among other things, a controller 205 (such as a programmable electronic microprocessor, microcontroller, or similar device), a power supply module 210, and an input/output module 215. The controller 205 includes, among other things, a processing unit 220 and a memory 225. The processing unit 220 is communicatively coupled to the memory 225 and executes instructions which are capable of being stored on the memory 225. The controller 205 is configured to retrieve from memory 225 and execute, among other things, instructions related to the control processes and method described herein. In other embodiments, the ECU 110 includes additional, fewer, or different components.

In the embodiment of FIG. 2, the input/output module 215 receives the omnidirectional images from the camera 105 and transmits the omnidirectional images to the controller 205 for image processing. The controller 205 then processes and transforms the images based on internal protocols and external commands. The ECU 110 transmits transformed images to the display 120 either via the communication bus 115 or another communications link between the ECU 110 and the display 120. In addition, the input/output module 215 receives commands from the input interface 125 identifying a region of interest of the omnidirectional image. The region of interest of the omnidirectional image represents a portion of the omnidirectional image that is determined, by the ECU 110 and/or the driver, to be particularly relevant to the driver at that point in time.

The input interface 125 includes driver controls 240 that enable the driver to manually select the region of interest of the omnidirectional image. The driver controls 240 may include, for example, buttons, dials, or joysticks. Often, the driver controls 240 are positioned in a convenient position for the driver, for example, on the steering wheel 130, on a center console, or on a dashboard. In particular, media keys for audio controls located on the steering wheel 130 may be configured to allow the driver to manually select the region of interest. In such embodiments, the controls perform dual-purpose functions, which each function being selected in various modes. For example, in a first mode, the media keys operate the audio controls, and in a second mode, the media keys input a signal defining the region of interest to the ECU 110. In such an example, the first mode may be default mode, and the second mode may be activated by a manual switch or by automatic activation upon a triggering event, such as putting the vehicle in a reverse gear.

In some embodiments, the input interface 125 does not include driver controls 240. Rather, the ECU 110 receives data from automated vehicle systems. The automated vehicle systems may automatically define the region of interest of the omnidirectional image. For example, a steering angle sensor 135 may input steering angle data to the ECU 110. Using the steering angle data, the ECU 110 is able to predict a direction of travel of the vehicle and to select the region of interest based on the predicted direction of travel. In other embodiments, both driver controls 240 and automated vehicle systems are used to define the region of interest. These systems may be used in cooperation or with assigned priorities. For example, when the vehicle is in reverse gear, the ECU 110 may determine the region of interest based on the steering angle data. Then, when activated, the driver controls 240 may override the region of interest determined based on the steering angle data. In such an embodiment with cooperative control, the driver controls 240 and the steering angle data may both assist in determining the region of interest. The cooperative control may have the steering angle sensor 135 and the driver controls 240 assigned different weights depending on predetermined priorities.

The input interface 125 may be linked through a communication module on the communication bus 115. In some embodiments, the input interface 125 communicates by means of a protocol such as J1939 or CAN bus for communicating with the input/output module 215. In other embodiments, the input interface 125 communicates with the input/output module 215 under other suitable protocols depending on the needs of the specific application. In some embodiments, the input interface 125 inputs information from various automotive controls and sensors.

Figure 3:
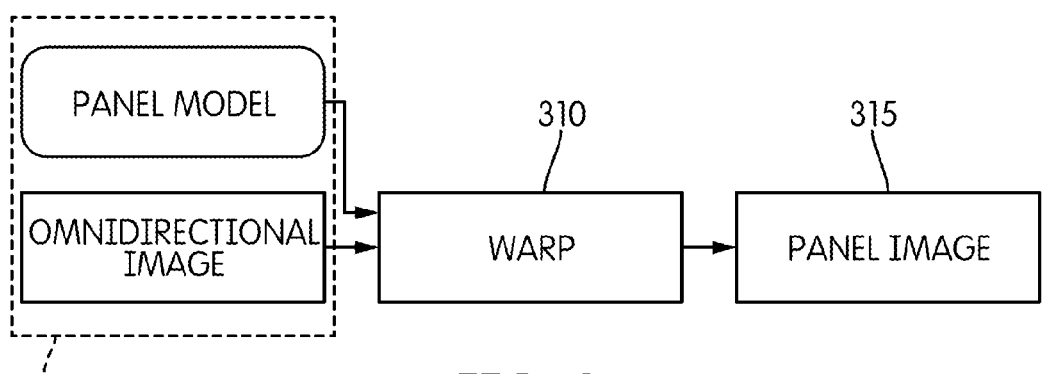
FIG. 3 is a flowchart of a method of transforming an omnidirectional image to a rectilinear image using the panel transform system of FIG. 1.

FIG. 3 illustrates a method of transforming a portion of the omnidirectional image captured by the camera 105 into a rectilinear image. In a first step, the ECU 110 loads the omnidirectional image from the camera 105 and loads a panel model (described below) (step 305). In a second step, the ECU 110 maps a portion of the omnidirectional image to the rectilinear image based on the panel model (step 310). In other words, the ECU 110 runs a warp routine to warp each pixel location of the portion of the omnidirectional image to a corresponding pixel location of the rectilinear image based on the panel model. In the process, the ECU 110 copies information from each pixel of the portion of the omnidirectional image to the corresponding rectilinear pixel. In a third step, a panel image (i.e., the rectilinear image) is generated and outputted (step 315). The output may then be sent to the display 120. It should be noted that this method of FIG. 3 may be repeated for additional panel models. Each panel model may describe a different portion of the omnidirectional image. When the ECU 110 outputs multiple rectilinear images based on multiple panel models, the display 120 may display multiple rectilinear images in various configurations.

Figure 4:
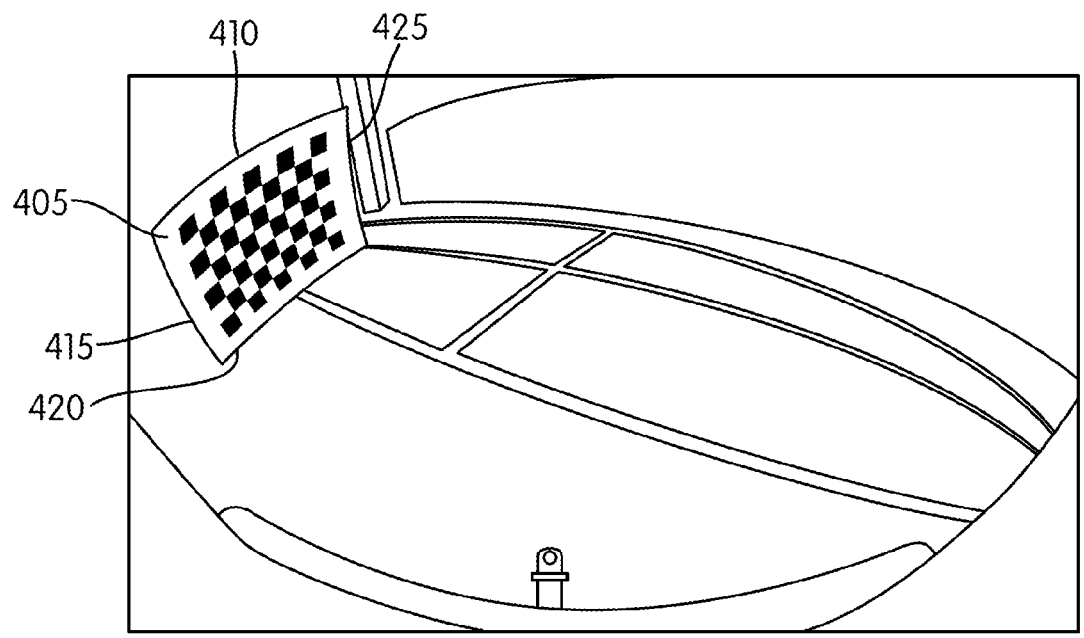
FIG. 4 is an omnidirectional image as inputted to an electronic control unit by an omnidirectional camera of FIG. 1 in the method of FIG. 3.
Figure 5:
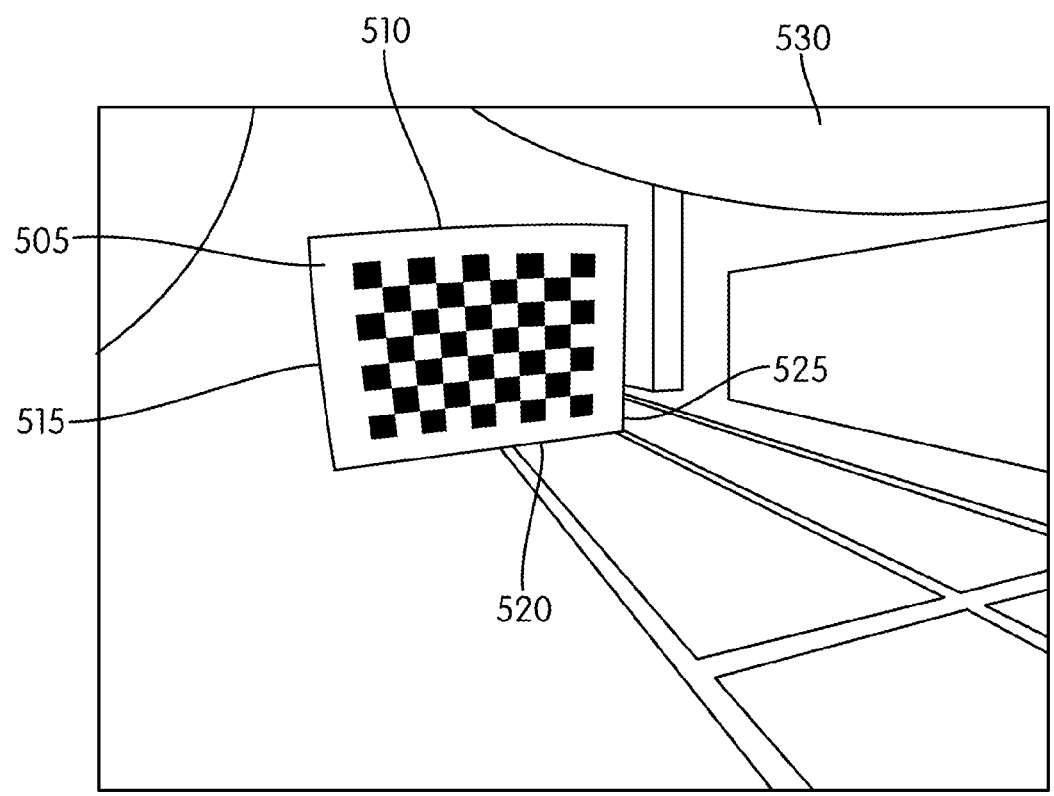
FIG. 5 is a rectilinear image output by the method of FIG. 3.

FIG. 4 illustrates an omnidirectional camera image before the transformation described in FIG. 3. As previously discussed, the omnidirectional image contains nonlinearities in the image. For example, a checkerboard 405 illustrates a how an omnidirectional image displays parallel lines. As illustrated, a top 410 and a left-side 415 of the checkerboard 405 are bowed outward. Conversely, a bottom 420, and a right-side 425 are bowed inward. In contrast, the omnidirectional image is illustrated after the transformation in FIG. 5. As the transformed image illustrates, a checkerboard 505 illustrates correction of the nonlinearities of the checkerboard 405. A top 510, a left-side 515, a bottom 520, and a right-side 525 of the checkerboard 505 approximate straight edges as captured by a rectilinear camera. An area 530 is a region of the image that is out of a field of view of the camera 105.

Figure 6:
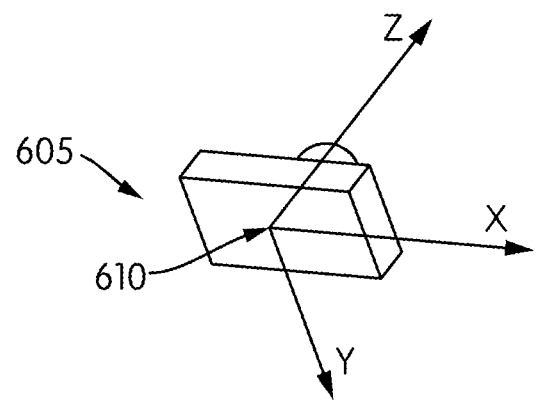
FIG. 6 is a 3D representation of an optical coordinate system in relation to the omnidirectional camera of the panel transform system of FIG. 1.

In other embodiments, the ECU 110 performs various transformations based on information from the omnidirectional image to enable different functions both within the ECU 110 and by other vehicle systems and controllers external to the imaging system. A reference frame is illustrated in FIG. 6. The reference frame includes an optical coordinate system (OCS) with coordinate [0,0,0] positioned at an optical origin 610. The optical origin 610 represents a center point where the camera 105 detects light from its surroundings (e.g., a pinhole camera). As illustrated, a Z-axis extends straight out along a center of a line of sight of the camera 105. A Y-axis extends downward and perpendicular to the center line of sight. An X-axis extends to the right side and perpendicular to the camera 105. This system of coordinates allows analysis of real-world positions by the ECU 110.

Prior to operation, a calibration procedure is performed to align the OCS with the optics of the camera 105. The calibration procedure uses a predefined pattern captured by the omnidirectional image. For example, calibration may use the checkerboard 405 to align the OCS with the omnidirectional image. During calibration, world locations represented by the checkerboard 405 and defined with respect to the OCS are mapped to pixel locations. Pixel locations are also mapped to vectors that point towards the corresponding world point (e.g., a position on the checkerboard 405).

Figure 7:
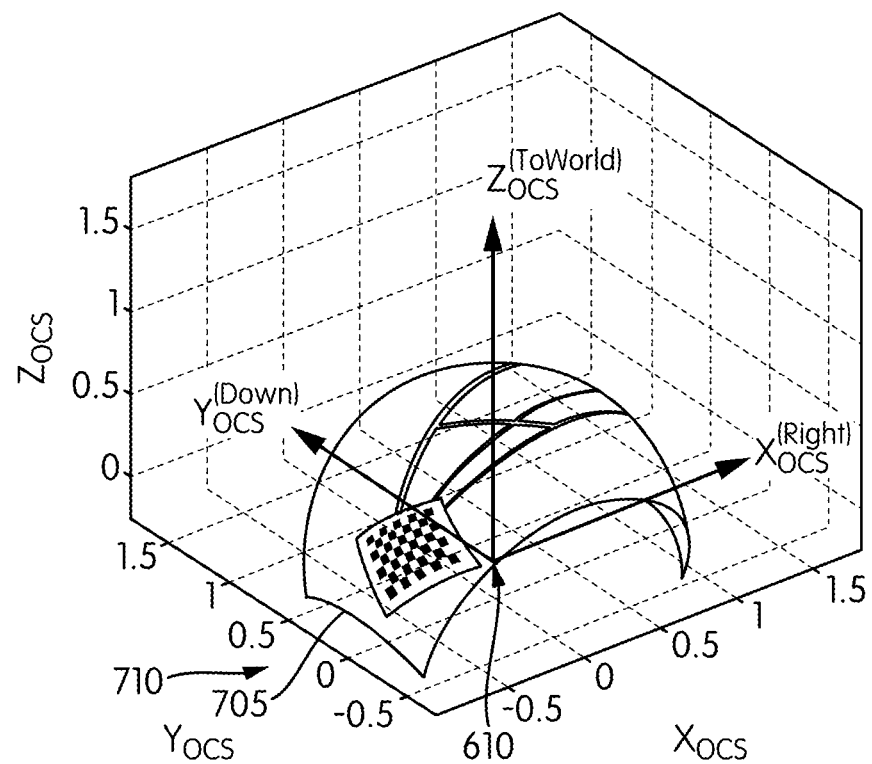
FIG. 7 is a 3D representation of a viewing sphere displayed on the optical coordinate system of FIG. 6.

FIG. 7 illustrates an omnidirectional image 705 displayed as a viewing sphere 710 overlaid on the OCS. In other words, the viewing sphere 710 represents the omnidirectional image 705 as received by the camera 105 within the OCS. The viewing sphere 710 may be an area defined by a set of vectors from the optical origin 610 with a magnitude of 1 unit (i.e., a unit sphere). The viewing sphere 710 provides a visual representation of the omnidirectional image 705. A plurality of pixels that form the omnidirectional image 705 are positioned within the area defined by the viewing sphere 710. It should be noted that while the viewing sphere 710 is theoretically contiguous, a maximum resolution of the omnidirectional image 705 depends on a quantity of the plurality of pixels. The quantity of pixels depending on the type of camera 105. In one embodiment, the ECU 110 stores the omnidirectional image 705 in memory 225 in a table of values based on a pixel location on the viewing sphere 710. The pixel location may be described in reference to the optical origin 610 (e.g., as a vector) or as a coordinate point on the viewing sphere 710.

Figure 8:
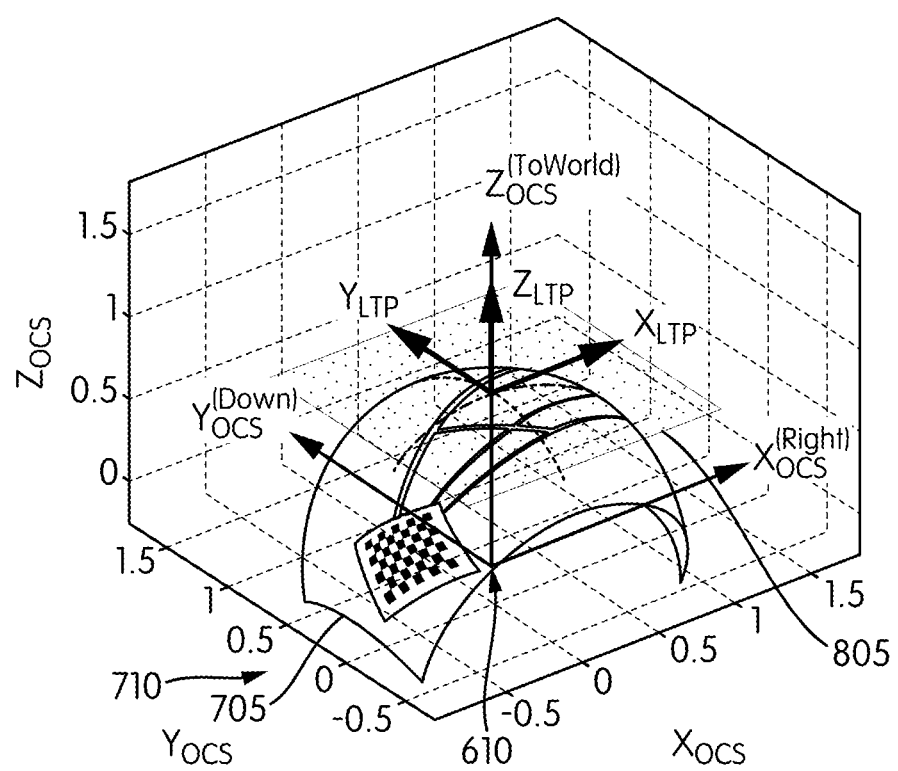
FIG. 8 is a 3D representation of the viewing sphere of FIG. 7 and a local plane tangent to the viewing sphere.

A local plane 805 tangent to the viewing sphere 710 is illustrated in FIG. 8. The local plane 805 is defined by a set of parameters loaded into the ECU 110. In one embodiment, the set of parameters includes values that describe a direction and orientation of the local plane 805, a vertical field of view, a horizontal field of view, and a scale factor. In such an embodiment, the direction and orientation of the local plane 805 may be defined by a yaw, pitch, and roll angle from the optical origin 610 or from angles from the optical coordinate axes. In this way, the direction of the local plane 805 is given by a parameter vector that points toward the center of the local plane 805. The vertical and horizontal fields of view may each be defined by an angle with the parameter vector intersecting the angle. The ECU 110 may store the set of parameters in the memory 225 in the form of a vector:

$$P = [P_{\psi_Y} P_{\psi_P} P_{\psi_R} P_{\theta_V} P_{\theta_H} P_A]^T \quad (1)$$

where $\{P_{\psi_Y}, P_{\psi_P}, P_{\psi_R}\}$ represent yaw, pitch, and roll respectively, $\{P_{\theta_V}, P_{\theta_H}\}$ represent the vertical and horizontal field of view (e.g. $P_{\theta_V} = P_{\theta_H} = 100°$), and $P_A$ is a scale factor that controls the resolution. In other words, $\{P_{\psi_Y}, P_{\psi_P}, P_{\psi_R}\}$ define the panel direction and orientation.

Once the set of parameters are defined by values, the local plane 805 may be transformed into a panel model. The panel model specifies an area of interest tangent to the viewing sphere 710 in reference to the OCS, and thereby also specifies an area of interest on the viewing sphere 710. The panel model may be defined by an intrinsic matrix of the form:

$$K = \begin{bmatrix} \alpha_x & 0 & x_0 \\ 0 & \alpha_y & y_0 \\ 0 & 0 & 1 \end{bmatrix} \quad (2)$$

where $\alpha_x$ and $\alpha_y$ represent scaling parameters, and $[x_0 \ y_0]^T$ is the point where the parameter vector intersects the local plane 805. The panel model represents a virtual perspective camera pointed in the direction of the parameter vector with the parameter vector originating at the optical origin 610. The panel model may include all of the information given by the set of parameters including direction, field of view, and resolution.

Figure 9:
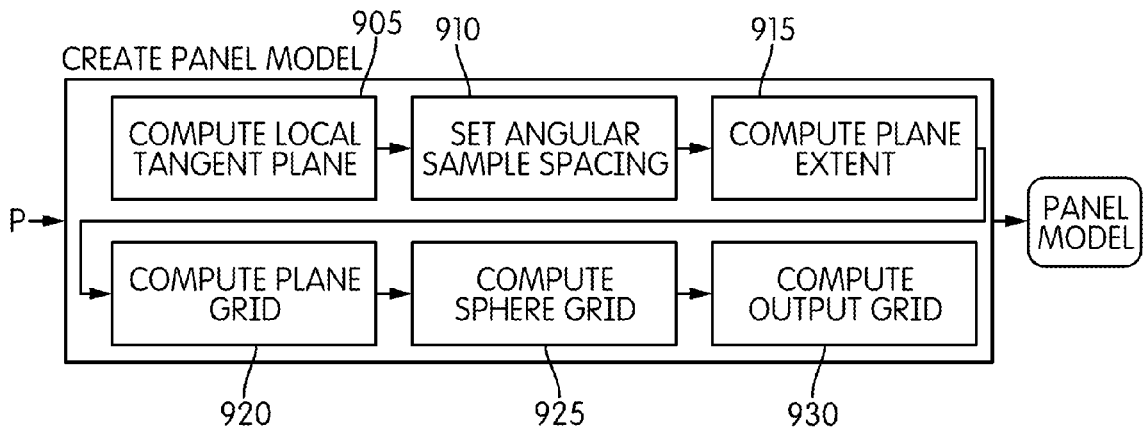
FIG. 9 is a flowchart of a method of creating a panel model with the panel transform system of FIG. 1.

FIG. 9 illustrates a method of determining the panel model based on the set of parameters. The ECU 110 computes the local plane 805 to the viewing sphere 710 based on the set of parameters (step 905). The ECU sets angular sample spacing of the local plane 805 (step 910). The ECU 110 calculates a plane extent of the local plane 805 (step 915). The ECU 110 determines a local plane grid (step 920). The ECU 110 determines a sphere grid based on the local plane grid (step 925). The ECU determines an output grid (step 930). The ECU determines the panel model based on the output grid (step 935).

Figure 10:
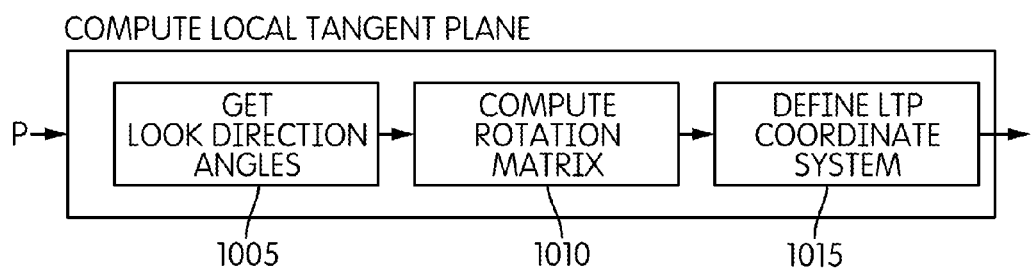
FIG. 10 is a flowchart of a method of computing the local plane illustrated in FIG. 8.

FIGS. 10-15 illustrate particular steps of the method illustrated in FIG. 9. In reference to step 905, FIG. 10 illustrates a method of computing the local plane 805. As described previously, the local plane 805 lies on top of the viewing sphere 710. The local plane 805 is determined by angular coordinates $[P_{\psi_Y} P_{\psi_P} P_{\psi_R}]^T$. The angular coordinates are specified by the user-defined parameters as discussed above. To compute the local plane 805, the ECU 110 determines the direction specified by the set of parameters (step 1005). The ECU 110 computes a rotation matrix (step 1010). Lastly, the ECU 110 defines a local plane coordinate system with an origin at the contact point between the parameter vector and the viewing sphere 710 (step 1015). In one embodiment, an initial basis $\{X, Y, Z\}$ is determined as follows:

$$X' = [1\ 0\ 0]^T$$

$$Y' = [0\ 1\ 0]^T$$

$$Z' = X' \times Y' \quad (3)$$

Using these values, the yaw angle is applied from the parameters as follows:

$$X'' = R_y(P_{\psi_Y})X'$$
$$Y'' = R_y(P_{\psi_Y})Y'$$
$$Z'' = R_y(P_{\psi_Y})Z' \quad (4)$$

where $$R_y(\theta) \triangleq \begin{bmatrix} \cos\theta & 0 & \sin\theta \\ 0 & 1 & 0 \\ -\sin\theta & 0 & \cos\theta \end{bmatrix} \quad (5)$$

The pitch angle is also applied from the parameters as follows:

$$X''' = R_y(P_{\psi_P})X''$$
$$Y''' = R_y(P_{\psi_P})Y''$$
$$Z''' = R_y(P_{\psi_P})Z'' \quad (6)$$

where $$R_x(\theta) \triangleq \begin{bmatrix} 1 & 0 & 0 \\ 0 & \cos\theta & -\sin\theta \\ 0 & \sin\theta & \cos\theta \end{bmatrix} \quad (7)$$

Similarly, the roll angle is applied from the parameters as follows:

$$X_{LTP} = R_z(P_{\psi_R})X'''$$
$$Y_{LTP} = R_z(P_{\psi_R})Y'''$$
$$Z_{LTP} = R_z(P_{\psi_R})Z''' \quad (8)$$

where $$R_z(\theta) \triangleq \begin{bmatrix} \cos\theta & -\sin\theta & 0 \\ \sin\theta & \cos\theta & 0 \\ 0 & 0 & 1 \end{bmatrix} \quad (9)$$

It should be noted that the steps above apply rotation matrixes in an arbitrary order. The steps may be performed in alternative orders. After applying the rotation matrixes, the ECU 110 determines the local plane 805 $\{X_{LTP}, Y_{LTP}, Z_{LTP}\}$ based on the following:

$$[X_{LTP} Y_{LTP} Z_{LTP}] = R_z(R_{\psi_R})R_x(P_{\psi_P})R_y(P_{\psi_Y}) \quad (10)$$

In a general sense, rotation matrices belong to the orthogonal group $O(n)$, and therefore, the expression may be simplified as:

$$[X_{LTP} Y_{LTP} Z_{LTP}] = \tilde{R} \quad (11)$$

where $\tilde{R} \in O(3)$ represents an arbitrary rotation matrix such that $\tilde{R}^T\tilde{R} = I$. The local plane coordinate system is then encoded by the ECU 110 in the following matrix:

$$M_{LTP} = \begin{bmatrix} [X_{LTP} Y_{LTP} Z_{LTP}] & Z_{LTP} \\ 0^T & 1 \end{bmatrix} = \begin{bmatrix} \tilde{R} & \tilde{R}[0\ 0\ 1]^T \\ 0^T & 1 \end{bmatrix} \quad (12)$$

where $M_{LTP}$ is a function called by the ECU 110 to transform a homogenous point or vector described by the local plane coordinate system to a homogenous point or vector described by the OCS.

Figure 11:
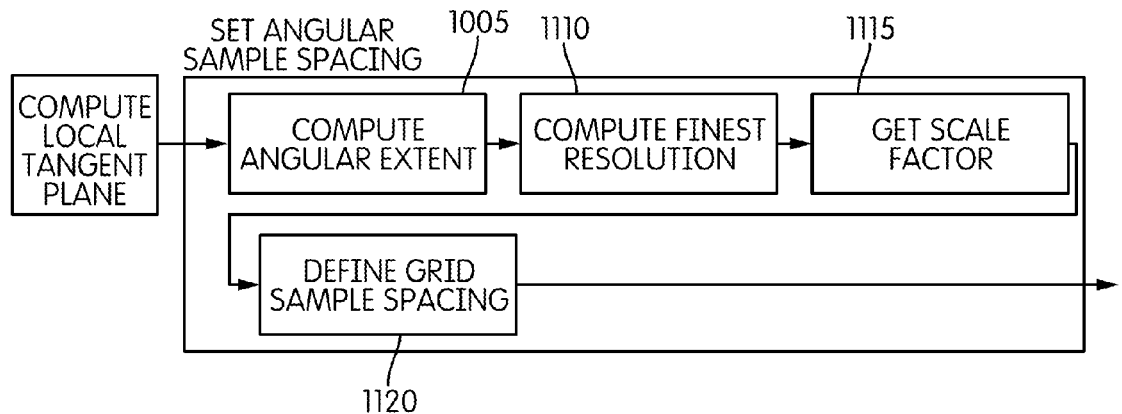
FIG. 11 is a flowchart of a method of setting an angular spacing for the method of FIG. 9.

After computing the local plane 805, the ECU 110 sets constant angular sample spacing using the steps illustrated in FIG. 11. The ECU 110 computes the angular extent (step 1105). The ECU 110 computes finest resolution (step 1110). Then, the ECU 110 reads the scale factor from the parameters (step 1115). Lastly, the ECU 110 defines grid sample spacing (step 1115). One embodiment for determining the constant angular sample spacing using steps 1105 through 1115 is illustrated in the steps that follow. Let h and w represent the height and width of the omnidirectional image 705. Then c and r are defined as follows:

$$c = linspace\left(0, \frac{w}{2}\right) \quad (13)$$

$$r = linspace\left(0, \frac{h}{2}\right) \quad (14)$$

The angular extent is computed as follows:

$$\theta_x = a\tan 2(c, -F(c)) \quad (15)$$

$$\theta_y = a\tan 2(r, -F(r)) \quad (16)$$

where F represents a forward projection function computed during the calibration procedure. The sample spacing is not uniform; however, using a simplification that it is, the sample spacing would be calculated as follows:

$$\mu_x = \frac{\max(\theta_x)}{w/2} \quad (17)$$

$$\mu_y = \frac{\max(\theta_y)}{h/2} \quad (18)$$

The finest resolution is determined.

$$\mu_\theta = \min(\mu_x, \mu_y) \quad (19)$$

where $\mu_\theta$ represents an ideal angular gridded support for the omnidirectional image 705. Next, the sample spacing on the local tangent plane is determined as follows:

$$\Delta = P_\Delta \tan\left(\frac{\mu_\theta}{2}\right) \quad (20)$$

where $P_\Delta > 1$ stretches the sample spacing, and $P_\Delta < 1$ compresses the sample spacing. As the sample spacing is stretched, the resolution of the image decreases, and conversely, as the sample spacing is compressed, the resolution increases.

Figure 12:
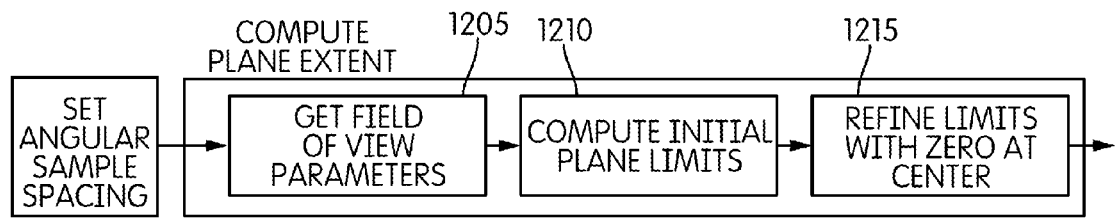
FIG. 12 is a flowchart of a method of computing a tangent plane extent for the method of FIG. 9.

The next step in determining the panel model is to compute a plane extent. The method of computing a plane extent is illustrated in FIG. 12. The ECU 110 loads the vertical and horizontal angles describing a field of view from the optical origin 610 based on the set of parameters (step 1205). The ECU 110 computes initial plane limits that define a boundary of the local plane 805 (step 1210). Lastly, the ECU 110 refines the initial plane limits by positioning zero at the center (step 1215). One embodiment of the method 1200 uses the following steps and equations. First, determine the extent of the local plane 805 with respect to the field of view parameters $[P_{\theta_V}, P_{\theta_H}]^T$. In other words, a complete perimeter of the local plane 805 is defined with limits that extend to the field of view defined by the vertical and horizontal angles. In one embodiment, the limits of the plane are determined by the following steps and equations.

$$x'_{lim} = [-1\ 1]\tan^{-1}\frac{P_{\psi_{LR}}}{2} \quad (21)$$

$$y'_{lim} = [-1\ 1]\tan^{-1}\frac{P_{\psi_{UD}}}{2} \quad (22)$$

The limits of the plane are modified to explicitly contain zero (see section below) using the equations presented as follows.

$$x''_{lim} = \text{round}\left(\frac{x'_{lim}}{\Delta}\right) \quad (23)$$

$$y''_{lim} = \text{round}\left(\frac{y'_{lim}}{\Delta}\right) \quad (24)$$

which yields $$x_{lim} = x''_{lim}\Delta \quad (25)$$

$$y_{lim} = y''_{lim}\Delta \quad (26)$$

In other words, the plane extent (i.e., the total area spanned by the local plane 805) is given by $$A_{LTP} = \|x_{lim}\|\|y_{lim}\| \quad (27)$$

Figure 13:
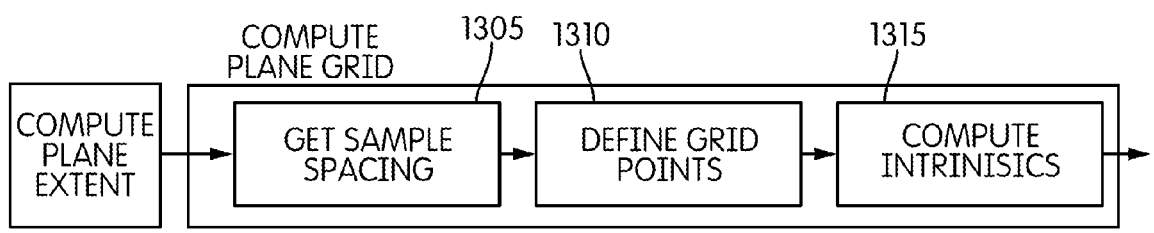
FIG. 13 is a flowchart of a method of computing a tangent plane grid for the method of FIG. 9.

The next step in determining the panel model is to compute the plane grid. The method of computing the plane grid is illustrated in FIG. 13. The ECU 110 loads the constant angular sample spacing from memory 225 (step 1305). The ECU 110 defines grid points (step 1310). Lastly, the ECU 110 computes intrinsic parameters of the camera 105 (step 1315). An embodiment of the method uses the following steps and equations. The ECU 110 calculates a set of grid points on the local plane 805. Each grid point corresponds to a world point of interest and has a corresponding pixel mapped to it. The ECU 110 determines an intrinsic matrix K. The ECU 110 computes the local plane grid by first determining the following vectors:

$$x_{LTP} = x_{lim}[1]:\Delta:x_{lim}[2] \quad (28)$$

$$y_{LTP} = y_{lim}[1]:\Delta:y_{lim}[2] \quad (29)$$

A local plane plaid grid is given by:

$$\{x_{LTP}, y_{LTP}\} = \text{meshgrid}(x_{LTP}, y_{LTP}) \quad (30)$$

where meshgrid is a standard MATLAB function, and $x_{LTP}$ and $y_{LTP}$ are matrices that store the grid points in the so-called plaid format. The grid is transformed to OCS using the following calculation:

$$\begin{bmatrix} x_{OCS}(:)^T \\ y_{OCS}(:)^T \\ z_{OCS}(:)^T \\ 1^T \end{bmatrix} = M_{LTP}\begin{bmatrix} x_{LTP}(:)^T \\ y_{LTP}(:)^T \\ 0^T \\ 1^T \end{bmatrix} \quad (31)$$

The internal camera parameters are given by the equation:

$$k_x = k_y = \frac{1}{\Delta} \quad (32)$$

Since the viewing sphere 710 is defined as a unit sphere, the focal length is normalized to unity (i.e., f=1). The ECU 110 sets pixel scale parameters using the following equations:

$$\alpha_x = fk_x \quad (33)$$

$$\alpha_y = fk_y \quad (34)$$

The intrinsic matrix is expressed in the following form:

$$K = \begin{bmatrix} \alpha_x & 0 & x_0 \\ 0 & \alpha_y & y_0 \\ 0 & 0 & 1 \end{bmatrix} \quad (35)$$

Figure 14:
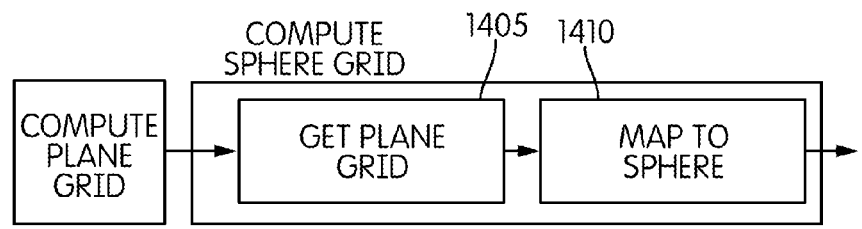
FIG. 14 is a flowchart of a method of computing a sphere grid for the method of FIG. 9.
Figure 15:
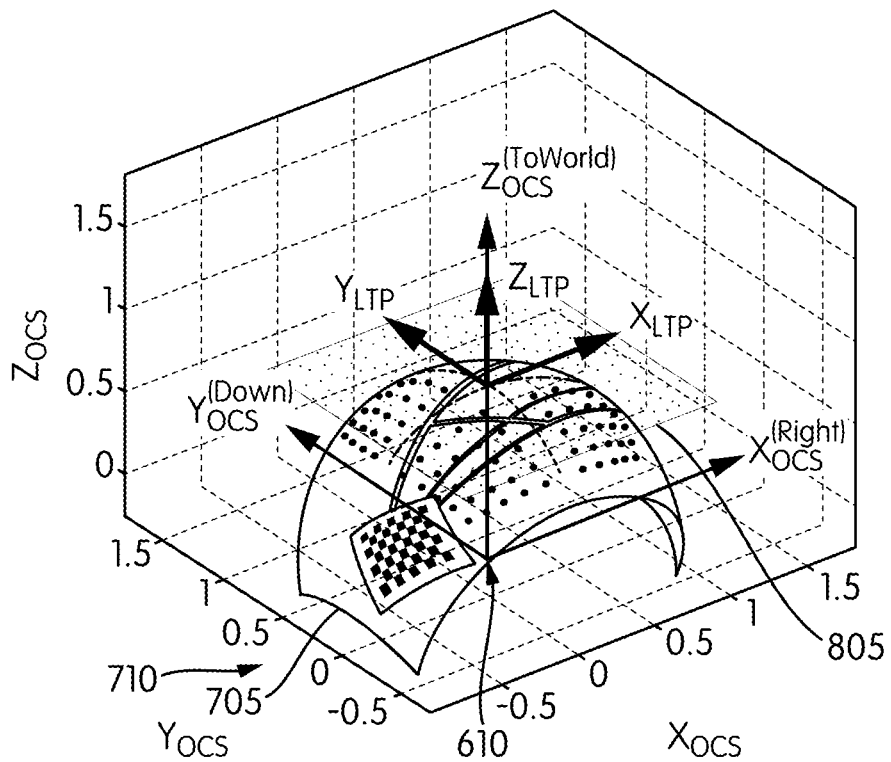
FIG. 15 is a 3D representation of a relationship of projected points between the viewing sphere and the local plane.

The next step in determining the panel model is computing the sphere grid. FIG. 14 illustrates a method to compute the sphere grid. In a first step, the ECU 110 loads the plane grid (step 1405). In a second step, the ECU 110 maps the local plane grid to the viewing sphere 710 (step 1410). An embodiment of the method 1400 uses the following steps and equations. The spherical grid is computed by projecting the local plane grid $\{x_{OCS}, y_{OCS}, z_{OCS}\}$ to the viewing sphere 710 $\{x_{sph}, y_{sph}, z_{sph}\}$ and defining the local plane grid with respect to the OCS. As an example, FIG. 15 illustrates the projected points $\{x_{sph}, y_{sph}, z_{sph}\}$ on the viewing sphere 710. The spherical grid $\{x_{sph}, y_{sph}, z_{sph}\}$ is computed by normalizing each grid sample (i,j) of the local plane grid $\{x_{OCS}, y_{OCS}, z_{OCS}\}$ with the following equation:

$$\begin{bmatrix} x_{sph}[i,j] \\ y_{sph}[i,j] \\ z_{sph}[i,j] \end{bmatrix} = \frac{[x_{OCS}[i,j]\,y_{OCS}[i,j]\,z_{OCS}[i,j]]^T}{\|[x_{OCS}[i,j]\,y_{OCS}[i,j]\,z_{OCS}[i,j]]^T\|} \quad (36)$$

In other words, a point on the plane $p_{plane}[i,j] = [x_{OCS}[i,j]\,y_{OCS}[i,j]\,z_{OCS}[i,j]]^T$ will have an L2 norm of $\|p_{plane}[i,j]\| \geq 1$ and by normalizing, such that $\|p_{plane}[i,j]\| = 1\ \forall i,j$ all points are projected to the viewing sphere 710.

Figure 16:
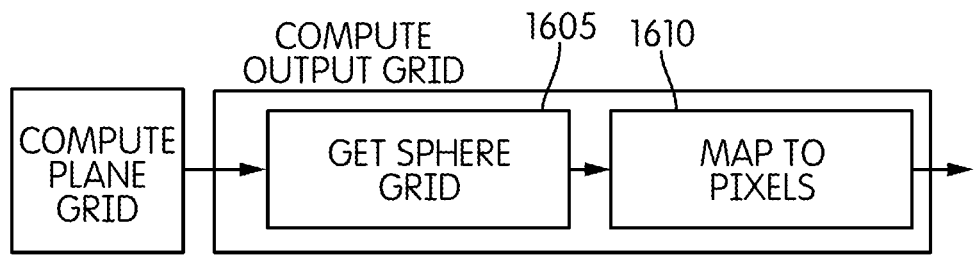
FIG. 16 is a flowchart of a method of computing an output grid for the method of FIG. 9.

In a last step for determining the panel model, the ECU 110 computes the output grid as illustrated in FIG. 16. In a first step, the ECU 110 loads the sphere grid (step 1605). In a second step, the ECU 110 maps the sphere grid to pixels on the viewing sphere 710 (step 1610). Mapping the sphere grid to pixels may include a process of interpolation using look-up tables. The ECU 110 then computes the panel model. The panel model represents a virtual camera perspective model. In other words, the panel model is a mathematical model of a viewing plane captured from the origin of the omnidirectional camera.

It should be noted that the ECU 110 may compute multiple panel models in parallel based on multiple sets of parameters. When multiple panel models are determined, the ECU 110 calculates each panel model separately based on each set of parameters. Each set of parameters may be determined independently based on various automatic or manual inputs. Some of the panel models may be held constant (at a set parameter vector) while others are repositioned and recalculated based on moving parameter vectors. The ECU 110 may output parallel rectilinear images based on the multiple panel models to the display 120 to display multiple different rectilinear images simultaneously. Alternatively, the ECU 110 may output multiple panel models for various functions relating to image processing.

Figure 17:
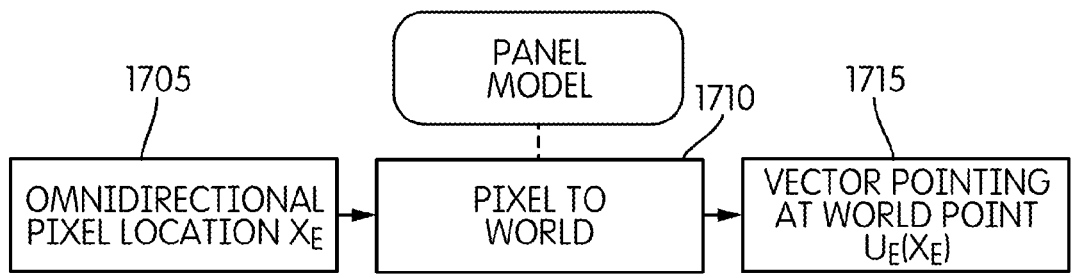
FIG. 17 is a flowchart of a method of converting an omnidirectional pixel location to a vector pointing to a world location using the panel model created from the method of FIG. 9.

The panel model allows the ECU 110 to perform various functions involving the omnidirectional image 705. For example, FIG. 17 illustrates a method 1700 of converting a panel pixel location $x_E$ to a vector pointing to a position in the world. The function back-transforms a pixel on the local panel 805 to a vector defined with respect to the OCS that points to a world point $U_E(X_E)$. In other words, if X represents a world location defined with respect to the OCS, and x represents the pixel that corresponds to this location, then this function forms $$u_E(x) = \frac{X}{\|X\|},$$

a vector pointing toward the world point. In a first step, the ECU 110 loads the omnidirectional pixel location from memory 225 (step 1705). In a second step, the ECU 110 calculates the vector pointing to a world location based on the panel model (step 1710). Third, the ECU 110 outputs the vector (step 1715). In one embodiment, the ECU 110 calculates the vector based on the following set of steps and equations. Given a panel pixel $x_E$, transform it to homogenous form $$x = \begin{bmatrix} x_E \\ 1 \end{bmatrix}.$$

Back project this pixel to form a ray. A point on this ray is given by the expression:

$$p = P^{\dagger} x \quad (37)$$

where $P^{\dagger}$ represents the pseudo-inverse of P=[K 0]. The homogenous world point p is transformed to Euclidian form, and denoted as $p_E$. Since a world location could be located at any point along the ray, normalize with the following convention:

$$v_E = \frac{p_E}{\|p_E\|} \quad (38)$$

To determine if the vector points towards the world point or away from the world point, perform a dot product of the world Z basis. If the result is positive, the ray points toward the world point. Conversely, if the result is negative, the ray points away from the world point. This result can be determined by the following expression:

$$s = \text{sign}([0 \ 0 \ 1]v_E) \quad (39)$$

A corrected vector is given by given by $sv_e$ expressed with respect to the local plane coordinate system. The vector may be expressed with respect to the OCS by using the following relationship:

$$u_E = sR_{LTP}{}^{OCS} v_E \quad (40)$$

where $R_{LTP}{}^{OCS} = \tilde{R}$ from the expression defined above for $M_{LTP}$.

Figure 18:
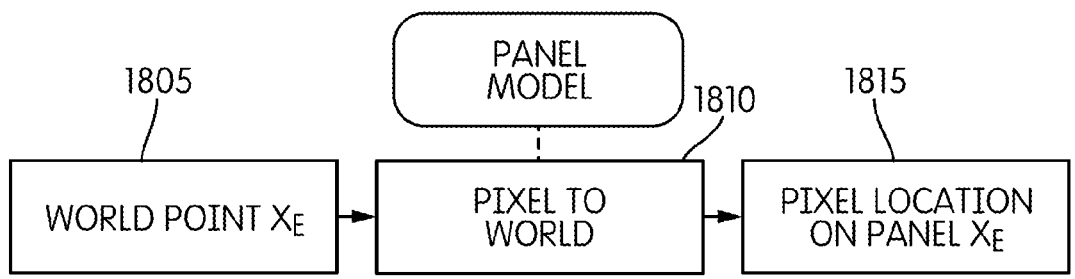
FIG. 18 is a flowchart of a method of converting a world location to a pixel location on the local plane using the panel model created from the method of FIG. 9.

In an example, which is illustrated in FIG. 18, the ECU 110 determines a pixel location on a panel from a world location defined with respect to the OCS based on the panel model. The panel refers to a plane aligned with the local plane 805 defined in terms of pixels, while the local plane 805 is defined in terms of distance (e.g. meters). In a first step, the ECU 110 loads a world point $X_E$ (step 1805). In a second step, the ECU 110 determines a pixel location on the panel based on the panel model (step 1810). In a third step, the ECU 110 outputs the pixel location (step 1815). The determination of the pixel location may be performed based on the following steps and equations. Rotate the world point $X_E$ into the local plane coordinate system:

$$X'_E = R_{OCS}{}^{LTP} X_E \quad (41)$$

where $R_{OCS}{}^{LTP} = (R_{LTP}{}^{OCS})^T$. Transform to homogenous form $$X = \begin{bmatrix} X'_E \\ 1 \end{bmatrix}$$

and map it to the pixel location with the following expression:

$$x = [K0]X \quad (42)$$

The homogenous pixel x is then transformed to Euclidian form $x_E$.

Figure 19:
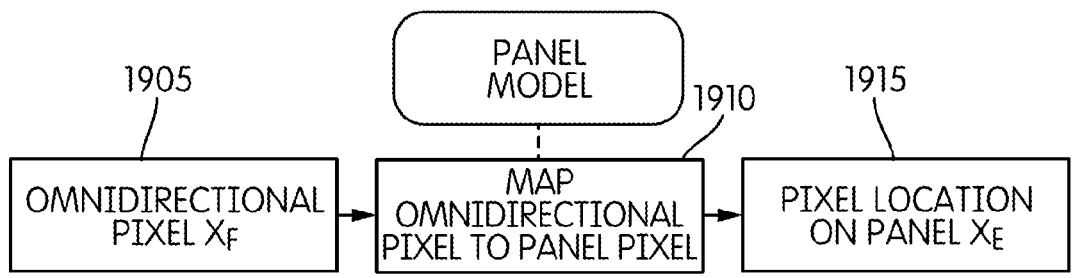
FIG. 19 is a flowchart of a method of converting a pixel location from an omnidirectional image to a pixel location on the local plane created from the method of FIG. 9.

In yet another example, the ECU 110 determines a pixel location on the panel from a pixel location on the omnidirectional image 705 based on the panel model as illustrated in FIG. 19. In a first step, the ECU 110 loads the pixel location from the omnidirectional image 705 (step 1905). In a second step, the ECU 110 determines the pixel location on the panel based on the panel model (step 1910). In a third step, the ECU 110 outputs the pixel location on the panel with respect to the local plane coordinate system (step 1915). In one embodiment, the ECU 110 determines the pixel location using the following steps and equations. Given the pixel location in the omnidirectional image 705 $x_f$, transform the pixel location to the viewing sphere 710:

$$X_C = g(x_f) \quad (43)$$

where g represents a function that maps an omnidirectional pixel location to a world location, and $X_C$ is a point on the viewing sphere 710 defined with respect to the OCS. Map the location $X_C$ to the local plane 805.

$$X'_L = h_{s \to p}(X_C) \quad (44)$$

Rotate from the OCS coordinate system to local plane coordinate system.

$$X_L = R_{OCS}{}^{LTP} X'_L \quad (45)$$

Convert from the local plane 805 to a pixel location on the panel.

$$x = \left(\frac{X_P[1:2] - 1}{\Delta}\right) + 1 \quad (46)$$

where x represents the pixel location on the panel using ones based indexing.

Figure 20:
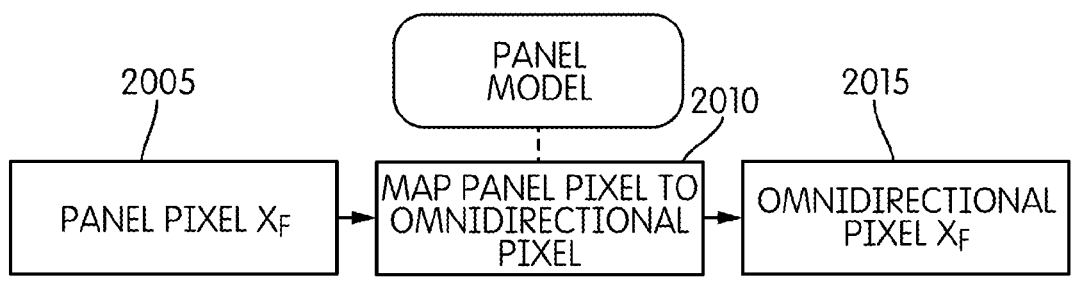
FIG. 20 is a flowchart of a method of converting a pixel location from the local plane to a pixel location on the omnidirectional image using the panel model created from the method of FIG. 9.

In yet another example, which is illustrated in FIG. 20, the ECU 110 determines a pixel location on the omnidirectional image 705 from a pixel location on the panel ($x_f$) based on the panel model. In a first step, the ECU 110 loads the pixel location on the panel (step 2005). In a second step, the ECU 110 determines the corresponding pixel location on the omnidirectional image 705 based on the panel model (step 2010). In a third step, the ECU 110 outputs the pixel location on the viewing sphere 710 with respect to the OCS (step 2015). In one embodiment, the ECU 110 determines the pixel location based on the following steps and equations. Transform the pixel location to the local plane coordinate system:

$$X_L = \begin{bmatrix} (x-1)\Delta + \ell_P \\ 0 \end{bmatrix} \quad (47)$$

where $$\ell_P = \begin{bmatrix} x_{lim}[1] \\ y_{lim}[1] \end{bmatrix}$$

represents a plane extent offset. Next, the world location on the local plane 805 is mapped to the viewing sphere 710 with the following computation:

$$X_C = h_{p \to s}(X_L) \quad (48)$$

where $h_{p \to s}$ is the local plane 805 to viewing sphere 710 function. Since, $X_C$ is defined with respect to the OCS, the ECU 110 can convert it to the pixel location.

$$x_f = f(X_C) \quad (49)$$

where f represents a function that maps the world location defined with respect to the OCS to the pixel location on the omnidirectional image 705.

Figure 21:
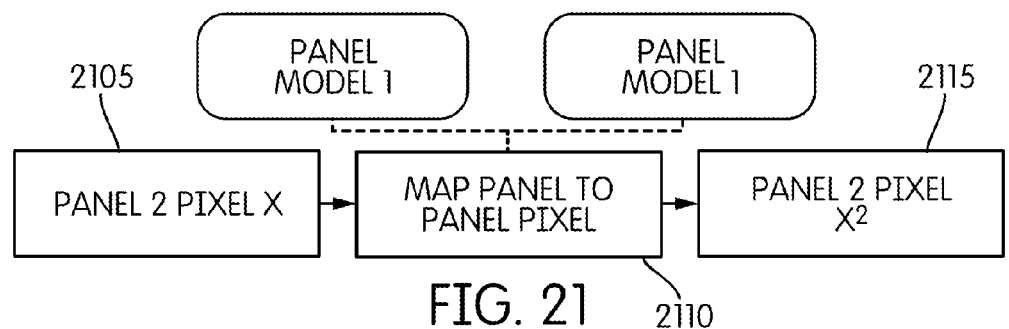
FIG. 21 is a flowchart of a method of converting a pixel location from a first local plane to another pixel location from a second local plane using a first panel model and a second panel model.

In another example, which is illustrated in FIG. 21, the ECU 110 determines a pixel location in a second panel based on a pixel location in a first panel. In a first step, the ECU 110 loads the pixel location from the first panel (step 2105). In a second step, the ECU 110 determines the corresponding pixel position on the second panel based on a comparison between the first panel model for the first panel and the second panel model for the second panel (step 2010). In a third step, the ECU 110 outputs the pixel position with reference to the second panel (step 2015). In one embodiment, the ECU 110 determines the pixel location with reference to the second panel using the following steps and equations. The ECU 110 maps the pixel location from the first panel x into world coordinates with the expression:

$$X_C = PAN_1 \cdot PixelToWorld(x) \quad (50)$$

where $PAN_1 \cdot PixelToWorld$ denotes the pixel location to world location transform with respect to the first panel. Next, the ECU 110 normalizes to the viewing sphere 710.

$$X'_C = \frac{X_C}{\|X_C\|} \quad (51)$$

The ECU 110 projects the point to the second panel.

$$X_L = PAN2 \cdot h_{s \to p}(X'_C) \quad (52)$$

where $PAN2 \cdot h_{s \to p}$ represents the viewing sphere 710 with respect to the second panel. The point on the second panel $X_L$ is converted to the pixel location on the second panel.

$$x' = \left(\frac{X_L[1:2] - 1}{\Delta}\right) + 1 \quad (53)$$

where x' represents the pixel location with respect to the second panel using ones based indexing.

Figure 22:
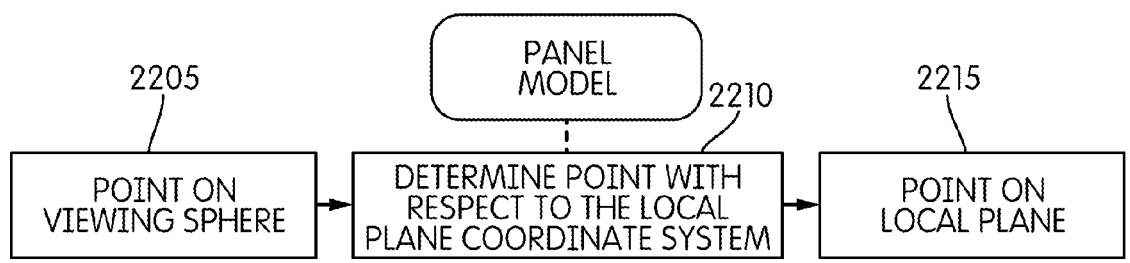
FIG. 22 is a flowchart of a method of converting a point on the viewing sphere to a point on the local plane using the panel model created from the method of FIG. 9.

In yet another example illustrated in FIG. 22, the ECU 110 determines a support function $h_{s \to p}$ as used in several examples herein. The ECU 110 determines a location of a point with respect to the local plane coordinate system from a point on the viewing sphere 710 defined with respect to the OCS. In a first step, the ECU 110 loads the coordinates of the point on the viewing sphere 710 (step 2205). In a second step, the ECU 110 determines the coordinates of the point with respect to the local plane coordinate system (step 2210). In a third step, the ECU 110 outputs the coordinates of the point with respect to the local plane coordinate system (step 2215). In one embodiment, the ECU 110 uses the following functions to determine the coordinates of the point with respect to the local plane coordinate system.

| point on plane | LTP.O |
| plane normal | LTP.Z |
| point on line | OCS.O = $[0\ 0\ 0]^T$ |
| line direction | $X_C$ |

Denoting the solution as $I_{OCS}$, the ECU 110 transforms from OCS coordinates to local plane coordinates using the following relationship:

$$\begin{bmatrix} X_L \\ 1 \end{bmatrix} = M_{OCS}^{LTP} \begin{bmatrix} I_{OCS} \\ 1 \end{bmatrix} \quad (54)$$

where $X_L$ is a point on the local plane 805 (e.g. the Z component is zero; $X_L[3]=0$)

Figure 23:
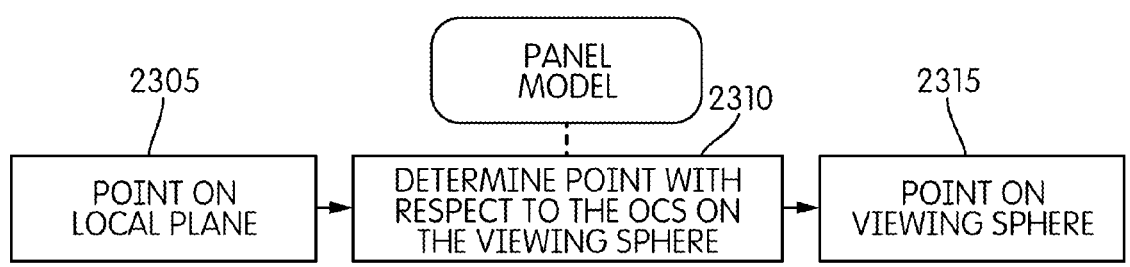
FIG. 23 is a flowchart of a method of converting a point on the local plane to a point on the viewing sphere using the panel model created from the method of FIG. 9.

In another example, which is illustrated in FIG. 23, the ECU 110 determines an additional supporting function, $h_{p \to s}$, that transforms a point on the local plane 805 defined with respect to the local plane coordinate system to a location of a point on the viewing sphere 710 defined with respect to the OCS. In a first step, the ECU 110 loads the coordinates of the point on the viewing sphere 710 (step 2305). In a second step, the ECU 110 determines the location of the point with respect to the OCS based on the panel model (step 2310). In a third step, the ECU 110 outputs the location of the point with respect to the OCS (step 2315). In one embodiment, the ECU 110 determines the coordinates of the point using the following steps and equations. Transform the point $X_L$ defined with respect to the local plane coordinate system to the OCS.

$$\begin{bmatrix} X'_C \\ 1 \end{bmatrix} = M_{LTP}^{OCS} \begin{bmatrix} X_L \\ 1 \end{bmatrix} \quad (55)$$

The OCS point is mapped to the viewing sphere 710.

$$X_C = \frac{X'_C}{\|X'_C\|} \quad (56)$$

It should be noted that these various functions may be performed by the ECU 110 in the process of operating the panel transform. These functions enable the ECU 110 to perform a wide variety of tasks relating to image transformations between an omnidirectional image model and a rectilinear image model.

Figure 24:
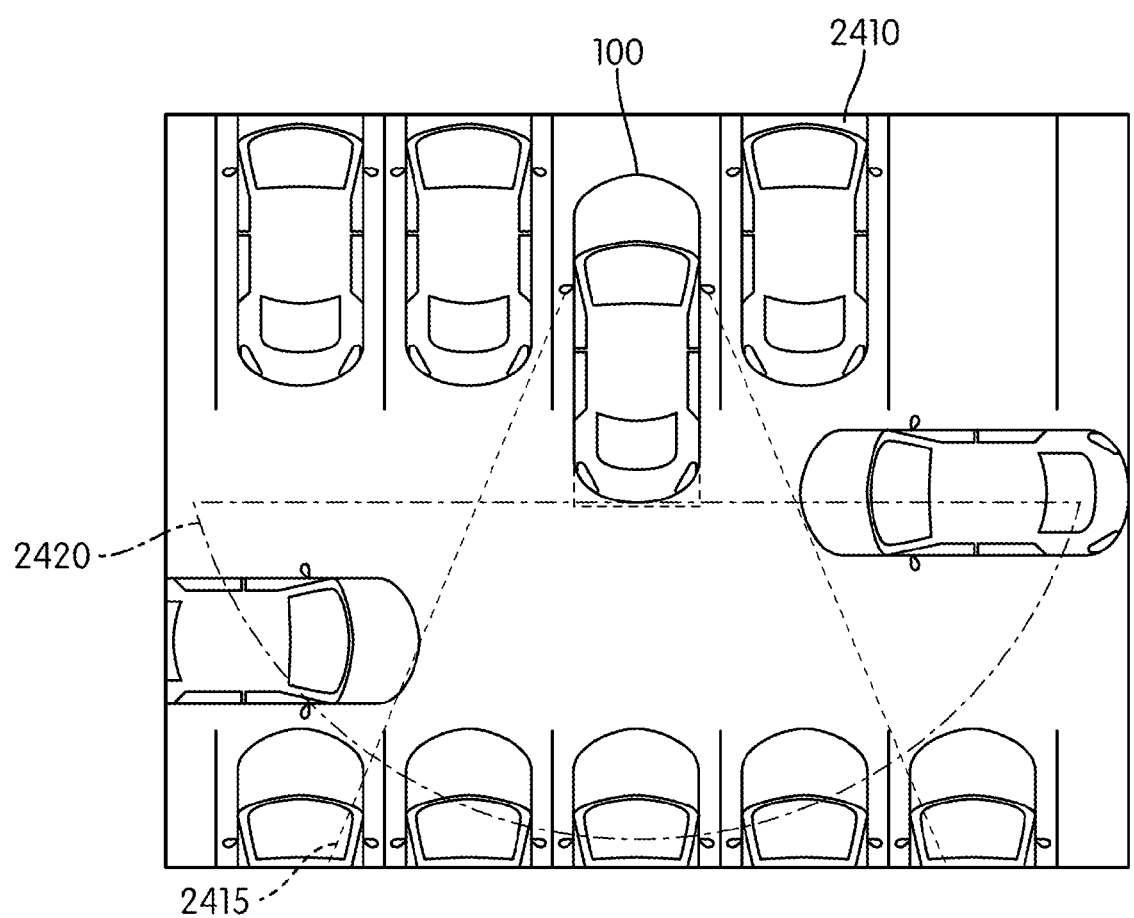
FIG. 24 is an overhead view of a vehicle demonstrating the fields of view of the panel transform system of FIG. 1.

For example, FIG. 24 illustrates fields of view for a vehicle 100 as the vehicle 100 is exiting from a parking space. The driver's natural vision is restricted by parked vehicles 2410 adjacent to the driver's parking space. Due to the parked vehicles 2410, the driver has a narrow field of view 2415 until the vehicle 100 clears the rear of the parked vehicles 2410. With the panel transform as illustrated in FIG. 1, the driver can proceed to exit the parking space with greater awareness. As previously explained, the camera 105 provides an omnidirectional image 705 to the ECU 110, and the ECU 110 transforms the omnidirectional image 705 into one or more rectilinear images for display to the driver. A field of view 2420 of the camera 105 extends perpendicular to the vehicle 100 to cover a wider area than the field of view 2415.

Figures 25A, 25B:
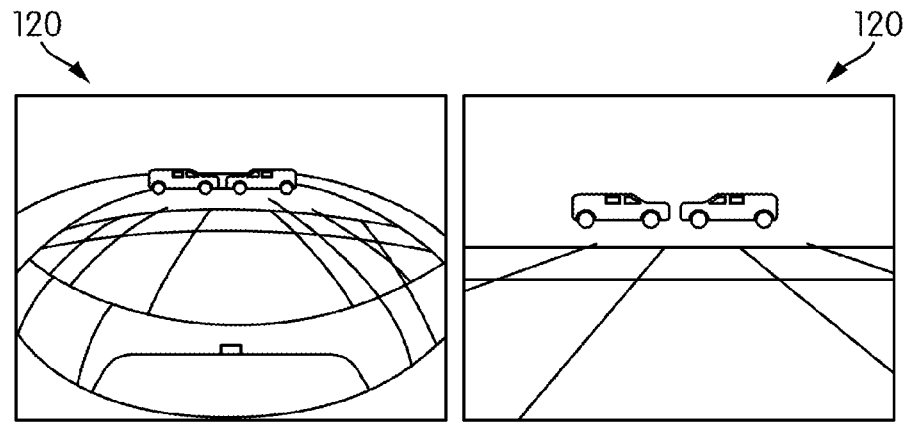
FIG. 25A is an omnidirectional image as inputted to an electronic control unit by an omnidirectional camera of FIG. 1.
FIG. 25B is a rectilinear image based on a transformation of the omnidirectional image of FIG. 25A.
Figures 25C, 25D:
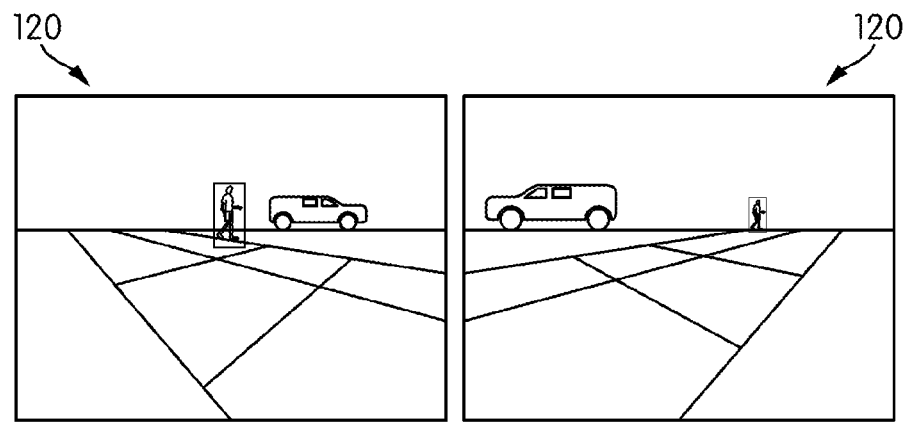
FIG. 25C is a rectilinear image based on a transformation using a different perspective vector than illustrated in FIG. 25B.
FIG. 25D is a rectilinear image based on a transformation using yet another perspective vector than that illustrated in FIG. 25B.

In one embodiment illustrated in FIGS. 25A through 25D, the display 120 displays several images from the ECU 110. In FIG. 25A, the display displays an omnidirectional image 705 as captured by the camera 105. In FIG. 25B, the ECU 110 first converts the omnidirectional image 705 based on a parameter vector aligned along the optical origin 610 of the camera 105. This image may be a default image sent by the ECU 110 on startup of the vehicle 100. In this image, the far left and the far right sides of the omnidirectional image 705 are not displayed by the rectilinear image. In this embodiment, the far left and the far right sides are not displayed even when the image is displayed at a maximum horizontal and vertical angles of view. FIG. 25C illustrates a rectilinear image when the parameter vector is orientated towards a first side of the vehicle 100. Similarly, FIG. 25D illustrates a rectilinear image when the parameter vector is orientated towards a second side of the vehicle 100.

Figure 26:
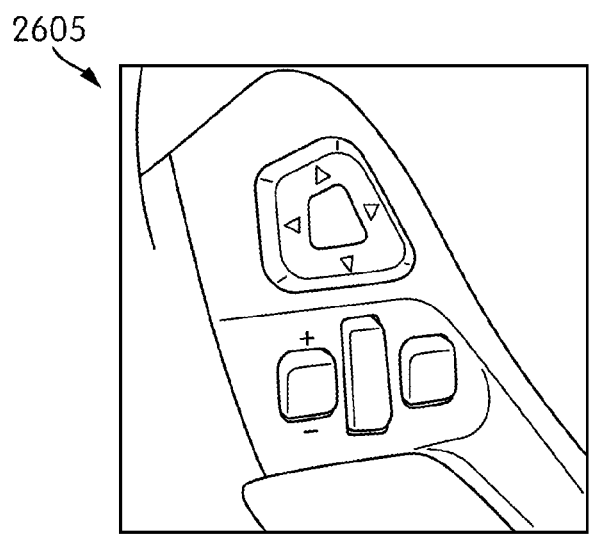
FIG. 26 is an example of driver-operated controls located on a steering wheel for adjusting the perspective vector of FIGS. 25C-25D.

FIG. 26 illustrates an embodiment of the input interface 125. In this embodiment, media keys 2605 are displayed that function as an input control for the ECU 110. Starting from the default image, the driver may operate the input interface 125 to adjust the parameter vector, and thus the image to a region of interest to the driver. For example, if the driver plans on exiting a parking space by reversing towards a passenger side of the vehicle 100, the driver may press a left arrow key to orientate the parameter vector to the passenger side. Then, the ECU 110 virtually changes the parameter vector further to the passenger side and thus allows the driver to view the image illustrated in FIG. 25C without physically moving the camera 105. It should be noted that the driver may also zoom in and zoom out the rectilinear image using the input interface 125. Therefore, through the parameter vector, the camera 105, even though fixed, may function as a virtual pan, zoom, and tilt camera.

Controls other than the input interface 125 may also adjust the parameter vector. These may be various types of driver-operated controls. For example, in one embodiment, the steering wheel 130 automatically adjusts the parameter vector to an angle based on the steering angle sensor 135. In such an embodiment, when the driver turns the steering wheel 130 clockwise, the ECU 110 orientates the parameter vector towards the passenger side in anticipation of the vehicle 100 reversing towards the passenger side. This automatic adjustment may only be enabled when the vehicle is in the reverse gear. In addition, automatic adjustment may be used in combination with manual adjustment using input controls as described previously. In this case, the automatic control and the manual control may work in conjunction to orientate the parameter vector in real-time as requested by each control. In another embodiment, the manual control and the automatic control may be assigned priorities. For example, the automatic control may take precedence over the manual control when the vehicle is in reverse. Conversely, the manual control may take precedence over the automatic control anytime the driver selects a mode for manual operation. The priorities may be changed based on driver selection or held fixed based on predetermined safety criteria.

In other embodiments, the ECU 110 may perform image processing in support of additional functions either within the ECU 110 or in other vehicle systems. In particular, a hardware module or a software module may be included in the vehicle that relies on rectilinear images to perform their intended functions. The ECU 110 can perform the various transformations described herein to provide these modules with a rectilinear image model defined by the panel model. Therefore, third party imaging modules may be installed on the vehicle that interface with the ECU 110 even when these modules are not designed to operate with an omnidirectional camera. For example, modules that perform structure from motion algorithms and trained classifiers (e.g., pedestrian detection) based on rectilinear images may be implemented using the transforms. In other words, the panel model of the omnidirectional image 705 may be performed as a preprocessing step to transform the omnidirectional image 705 into a rectilinear image for direct use by preexisting algorithms.

Some preexisting algorithms require a large field of view, which may be provided by multiple rectilinear cameras. However, multiple cameras increase the cost of the vehicle. Advantageously, embodiments of the panel transform provide multiple rectilinear image feeds from a single omnidirectional camera 105 using multiple parameter vectors and multiple panel models as inputs to these multiple rectilinear image algorithms. For example, the panel transform may provide three 60 degree rectilinear views side-by-side on the display 120 based on a 180 degree omnidirectional image 705. In this case, the ECU 110 would determine three parameter vectors to transform the omnidirectional image 705 and reconstruct a single image for display based on the three rectilinear images.

Thus, the invention provides, among other things, a panel transform in a vehicle that performs various functions with an omnidirectional image 705 captured from an omnidirectional camera 105 and outputs various values depending on the particular function being performed. Various features and advantages of the invention are set forth in the following claims.

What is claimed is:

1. A method of operating a vehicle imaging system, the method comprising:

receiving, at an electronic control unit, an omnidirectional image from a vehicle-based omnidirectional camera;

determining a first angular perspective vector;

generating a first rectilinear image orthogonal to the first angular perspective vector;

displaying the first rectilinear image to a driver of the vehicle;

receiving commands from a driver-operated, dual-purpose control, the driver-operated, dual-purpose control being configured to control a vehicle function in a first mode and the vehicle imaging system in a second mode, adjusting the angular perspective vector based on the commands;

generating a second rectilinear image orthogonal to the adjusted angular perspective vector; and displaying the second rectilinear image to the driver.

2. The method of claim 1, wherein determining the angular perspective vector includes determining a yaw angle, a pitch angle, and a roll angle of the angular perspective vector in reference to an optical coordinate system defined with respect to the omnidirectional camera.

3. The method of claim 2, further comprising:

accessing an omnidirectional camera model representative of the omnidirectional image projected onto a unit sphere in the optical coordinate system, wherein the angular perspective vector at least partially defines a local plane, and wherein the local plane is tangent to the unit sphere and orthogonal to the angular perspective vector.

4. The method of claim 3, further comprising:

determining a plane extent of the local plane, wherein the plane extent defines a boundary of the local plane based, at least in part, on the commands.

5. The method of claim 3, the method further comprising:

determining a relationship between the local plane and the unit sphere, and wherein generating the second rectilinear image is based on the determined relationship.

6. The method of claim 5, wherein determining a relationship between the local plane and the unit sphere depends on the angular perspective vector.

7. The method of claim 1, wherein the driver-operated, dual-purpose control includes buttons on a steering wheel.

8. The method of claim 1, further comprising receiving an input from another driver-operated control and selecting the second mode based on the input from the another driver-operated control.

9. The method of claim 8, wherein the another driver-operated control is a gear shift control.

10. A vehicle imaging system comprising:

an omnidirectional camera;

a display;

a driver-operated, dual-purpose control configured to control a vehicle function in a first mode and control a vehicle imaging system in a second mode; and an electronic control unit configured to receive an omnidirectional image from the omnidirectional camera, determine a first angular perspective vector, generate a first rectilinear image orthogonal to the first angular perspective vector, send the first rectilinear image to the display, enter into the second mode, receive commands from the driver-operated, dual-purpose control, adjust the angular perspective vector based on the commands, generate a second rectilinear image orthogonal to the adjusted angular perspective vector, and send the second rectilinear image to the display.

11. The vehicle imaging system of claim 10, wherein an electronic control unit configured to determine the angular perspective vector also determines a yaw angle, a pitch angle, and a roll angle of the angular perspective vector in reference to an optical coordinate system defined with respect to the omnidirectional camera.

12. The vehicle imaging system of claim 11, wherein the electronic control unit is further configured to:

access an omnidirectional camera model representative of the omnidirectional image projected onto a unit sphere in the optical coordinate system, wherein the angular perspective vector at least partially defines a local plane, and wherein the local plane is tangent to the unit sphere and orthogonal to the angular perspective vector.

13. The vehicle imaging system of claim 10, wherein the electronic control unit is further configured to:

determine a relationship between the local plane and the unit sphere, and generate the second rectilinear image based on the determined relationship.

14. The vehicle imaging system of claim 13, wherein the electronic control unit configured to determine a relationship between the local plane and the unit sphere determines the relationship based on the angular perspective vector.

15. The vehicle imaging system of claim 10, wherein the driver-operated, dual-purpose control includes buttons on a steering wheel.

16. The vehicle imaging system of claim 10, wherein the electronic control unit is further configured to enter into the second mode based on an input from another driver-operated control.

17. The vehicle imaging system of claim 16, wherein the another driver-operated control is a gear shift control.

* * * * *